(12) United States Patent
Culpepper

(10) Patent No.: US 7,904,484 B2
(45) Date of Patent: Mar. 8, 2011

(54) INCREMENTAL PACKAGING

(75) Inventor: Marshall Andrew Culpepper, Lewisville, TX (US)

(73) Assignee: Red Hat, Inc., Raleigh, NC (US)

( * ) Notice: Subject to any disclaimer, the term of this patent is extended or adjusted under 35 U.S.C. 154(b) by 368 days.

(21) Appl. No.: 11/998,503

(22) Filed: Nov. 30, 2007

(65) Prior Publication Data

US 2009/0144336 A1 Jun. 4, 2009

(51) Int. Cl.
*G06F 7/00* (2006.01)
*G06F 17/30* (2006.01)

(52) U.S. Cl. ......... 707/802; 717/168
(58) Field of Classification Search .......... 707/101, 707/802; 717/168–173
See application file for complete search history.

(56) References Cited

U.S. PATENT DOCUMENTS

| | | | | |
|---|---|---|---|---|
| 6,393,437 | B1* | 5/2002 | Zinda et al. | 707/201 |
| 7,127,707 | B1* | 10/2006 | Mishra et al. | 717/137 |
| 7,222,138 | B2* | 5/2007 | Fomenko | 707/203 |
| 7,337,427 | B2* | 2/2008 | Carrigan | 717/100 |
| 7,503,034 | B2* | 3/2009 | Berg et al. | 717/120 |
| 7,555,749 | B2* | 6/2009 | Wickham et al. | 717/168 |
| 2003/0158919 | A1* | 8/2003 | Fomenko | 709/220 |
| 2003/0159130 | A1* | 8/2003 | Broussard et al. | 717/120 |
| 2005/0149922 | A1* | 7/2005 | Vincent | 717/172 |
| 2006/0130038 | A1* | 6/2006 | Claussen et al. | 717/168 |
| 2007/0180444 | A1* | 8/2007 | Hoover et al. | 717/168 |
| 2008/0109802 | A1* | 5/2008 | Carrigan | 717/171 |

OTHER PUBLICATIONS

Des Rivieres, Jim, et al. "Eclipse Platform Technical Overview", 18 pages, Copyright 2006 International Business Machines Corp. downloaded from http://www.eclipse.org/articles.Whitepaper-Platform-3.1/eclipse-platform-whitepaper.html.

* cited by examiner

*Primary Examiner* — John E Breene
*Assistant Examiner* — Joshua Bullock
(74) *Attorney, Agent, or Firm* — Blakely, Sokoloff, Taylor & Zafman LLP

(57) ABSTRACT

A project directory structure of an application or service is mapped to a package directory structure. A package is built for the application or service by copying files from the project directory structure to the package directory structure in accordance with the mapping. An event trigger is detected, wherein the event trigger is one of a new file, a modified file, or a deleted file in the project directory structure. An updated package is built for the application or service by performing an appropriate one of copying the new file to the package directory structure, replacing an existing file in the package directory structure with the modified file, or deleting a file in the package directory structure that corresponds to the deleted file in the project directory structure.

18 Claims, 6 Drawing Sheets

INCREMENTAL PACKAGING

TECHNICAL FIELD

Embodiments of the present invention relate to software development, and more specifically to incrementally packaging applications or services for deployment.

BACKGROUND

Before an application or service can be deployed for use, the application or service must first be developed. Development is an iterative process in which code is written, compiled, packaged, and deployed to an application server numerous times before a usable product emerges. A conventional application server expects components of the package to appear in specific locations of the package. However, these specific locations do not generally correspond to locations at which they are placed during development (e.g., in a project directory structure).

To ensure that components of the application appear in the appropriate locations, once a version of code is written and compiled, it is then packaged. Packaging copies the components of the application from a project directory structure to appropriate locations in a package directory structure. Conventional packaging is performed upon a user command to generate a package after a version of the code is ready for testing. Such conventional packaging copies the contents of the entire project directory structure into a package directory structure. Such conventional packaging also generally requires a programmer to write a script or other automated process that moves files from the project directory structure to the package directory structure. The script identifies where in the package directory structure to place each file from the project directory structure. Once packaging is complete, the package can be deployed to an application server, and tested.

Testing generally reveals multiple flaws or bugs in the application that need to be fixed. After the flaws are fixed, the programmer again initiates packaging, and again deploys the package to the application server. This process is repeated until the application is sufficiently free from flaws.

Some conventional development tools provide incremental project building. Incremental project building recompiles code of a project as the code is written. Incremental project building operates at a code level, recompiling code for an individual file as the code is written. However, an application or service generally includes multiple files. Incremental project builders do not operate at a file level. Therefore, when a programmer wishes to deploy an application, he must still manually generate a package for deployment.

BRIEF DESCRIPTION OF THE DRAWINGS

The present invention is illustrated by way of example, and not by way of limitation, in the figures of the accompanying drawings and in which.

DETAILED DESCRIPTION

Figure 1:
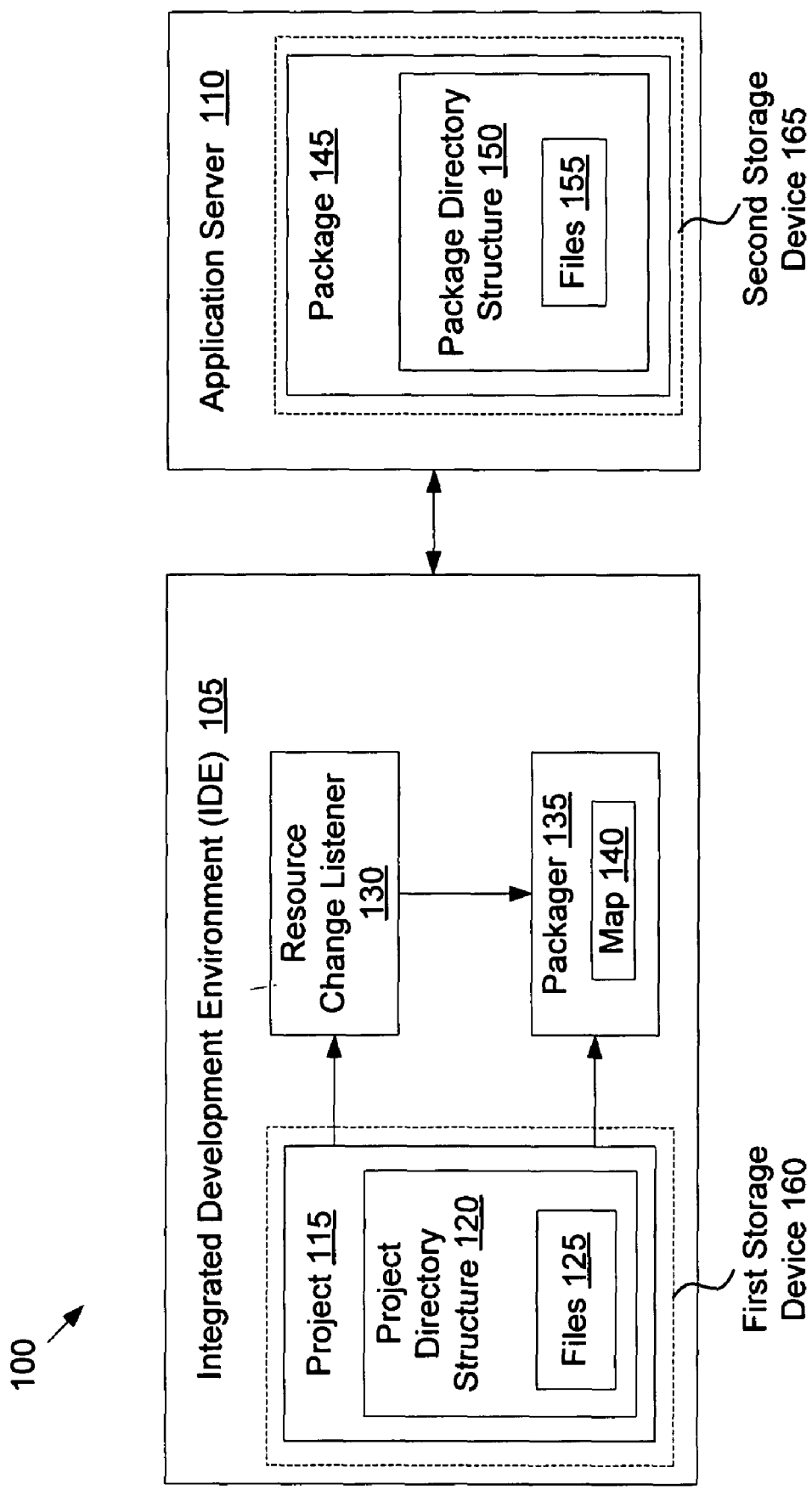
FIG. 1 illustrates an exemplary computer system, in which embodiments of the present invention may operate.

Described herein is a method and apparatus for incrementally packaging applications and services. In one embodiment, a project directory structure of an application or service is mapped to a package directory structure. A package is built for the application or service by copying files from the project directory structure to the package directory structure in accordance with the mapping. An event trigger can be detected. The event trigger may be detection of a new file, a modified file, or a deleted file in the project directory structure. An updated package is built for the application or service by performing an appropriate action based on the detected event trigger. For example, if a new file is detected, the new file may be copied to the package directory structure. If a modified file is detected, an existing file in the package directory structure may be replaced with the modified file. If a deleted file is detected, a file in the package directory structure that corresponds to the deleted file in the project directory structure may be deleted. Updating the package directory structure as event triggers are detected allows a package to be incrementally updated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "mapping", "building", "detecting", "determining", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary computer system 100, in which embodiments of the present invention may operate. The computer system 100 includes an integrated development environment (IDE) 105 and an application server 110. In one embodiment, the IDE 105 and the application server 110 are collocated on a single machine. Alternatively, the IDE 105 and the application server 110 may be located on different machines that are connected directly or via a network (e.g., local area network (LAN), wide area network (WAN), the Internet, etc.). The machines may be desktop computers, laptop computers, servers (e.g., web servers), personal digital assistants (PDAs), etc. Each machine may be an individual computing device or a cluster of multiple computing devices.

The integrated development environment (IDE) 105 is an application that facilitates software development by providing multiple development tools in a unified interface. Such development tools may include, for example, a source code editor, a compiler and/or interpreter, automation tools (e.g., a packager 135), a debugger, and so on. Through these tools, the IDE 105 enables a programmer to author, modify, compile, package, deploy, and/or debug software in an efficient manner. The IDE 105 in one embodiment supports multiple programming languages (e.g., Visual Basic, C++, Java, Python, Perl, Fortran, Cobol, etc.). Alternatively, IDE 105 may be configured to support only a single programming language, such as Java or C++.

In one embodiment, the IDE 105 includes a graphical user interface (GUI). Through the graphical user interface, the IDE 105 can display projects 115, project directory structures 120, and so on. In another embodiment, the IDE 105 includes a command line interface.

The IDE 105 manages projects 115, each of which represents an application or service that is in development. The application or service may be an application to run on a specific operating system, a web service, a service accessible via a distributed computing system, etc. Each project 115 maps to a specific project directory structure 120.

Each project directory structure 120 is an organization of folders and files related to a specific project 115. The organization of project directory structures 120 may be based on user preference, a type of application or service being developed, programming languages being used, etc. In one embodiment, the project directory structure 120 is user-defined. For example, a programmer may generate and organize multiple folders for a project (e.g., a bin folder, root folder, class folder, etc.), and place different files 125 in each folder. Alternatively, project directory structures 120 may be automatically provided by the IDE 105. Such provided project directory structures 120 may be common directory structures used for programming specified types of programs or services. In one embodiment, project directory structures are provided as templates. Templates reflect common development structures, and automatically determine necessary associations for a user if the user uses one of the common development structures.

Different project directory structures 120 may be stored on the same drive or on different drives (e.g., disk drives, optical drives, solid state drives, etc.), which may be internal or external (e.g., connected via a network) to the machine on which the IDE 105 runs. Project directory structures 120 may share a similar format (e.g., share sibling subdirectories), or may be differently formatted.

Each project directory structure 120 contains files 125 that are created and modified by a user for a project 115. Each of the files 125 is accessible to programs and tools of the IDE 105, and to an underlying operating system. The number and types of files 125 included in a project 115 may depend on the complexity of the project 115, purpose of the project 115, programming preference of the user, and/or on other variables. Examples of file types include class files, jar files, deployment descriptors, etc.

The project 115 (and project directory structure 120) is stored on a first storage device 160. The first storage device 160 may be a hard disk drive, an optical drive, a tape backup drive, or a combination thereof. In one embodiment, first storage device 160 is internal to a machine on which the IDE 105 is located. Alternatively, the first storage device may be external to the machine on which the IDE 105 is located.

As a project 115 is developed, the project directory structure 120 and/or files 125 within the project directory structure 125 for that project 115 may change. It can be useful to track the changes that are made to the files 125 and to the project directory structure 120. In one embodiment, the IDE 105 includes a resource change listener 130 that monitors one or more projects 115, and records an event each time a project 115, folder, file 125, or other resource changes (e.g., when a file or folder is created, copied, moved, and/or the contents of a file or folder are changed). For example, the resource change listener 130 may note the resource a change corresponds to, a type of modification (e.g., added, removed or changed resource), a precise nature of the change, a summary of markers that have been changed on the resource, deltas for any added, removed or changed children (resource dependent on the changed resource), a path from an old location to a new location for the resource, etc. The resource change listener 130 can detect what resources have changed, and how they have changed. The resource change listener 130 can store the detected changes, and/or report the detected changes to the IDE 105 and/or tools of the IDE 105. In one embodiment, the resource change listener 130 records enough information (e.g., in a change history) to revert the project 115 back to a previous unchanged state if necessary.

Packager 135 packages projects 115 to put them in a condition for deployment. Packaging a project 115 (otherwise known as application assembly) includes combining discrete components (e.g., resources) of a project into a single unit (called a package 145) that can be deployed to an application server 110. A package 145 can be classified as a module (e.g., a plug-in for an application) or as a full-fledged application or service. The package 145 includes a package directory structure 150 that may be the same or different from the project directory structure 120. The package directory structure 150 is organized in such a way that the application server 110 can process the package 145. This may include following a specified folder layout, providing specified folder names, providing files 155 within specified folders, wherein the files 155 have specified names, etc. within the package directory structure 145.

The package directory structure 150 may include multiple files 155. For example, the package directory structure 150 may include one or more class files and/or other dynamic resources, static resources, descriptive meta information, etc. If the package 145 is not properly formatted (e.g., folders and/or files are not named correctly, files are not located in proper folders, etc.), the package may not be correctly deployed on the application server 110. In one embodiment, there is a one to one mapping between the files 125 of the project 115 and the files 155 of the package 145. Alternatively, fewer than all of the files 125 of the project 115 may be placed in the package 145.

The packager 135 builds packages 145 from projects 115. In one embodiment, packager 135 compresses (e.g., archives) packages 145 once they are built. Packager 135 may be a native tool of the IDE 105, or may be a plug-in to the IDE 105.

To build a package 145, packager 135 generates the package directory structure 150, and copies files 125 to the package directory structure 150 according to a map 140. The map 140 may be generated when the project 115 is created, or when a user first directs the IDE 105 to generate a package 145. The map 140 includes multiple associations between folders of the project directory structure 120 and the package directory structure 145, and/or between specific files 125 of the project 115 and files 155 of the package 145. In order for the map 140 to be generated, a user may set up a project directory structure 120 that he intends to use for the project 115. He may then associate one or more components (e.g., folders and/or files) of the project directory structure 120 with a package directory structure 150. The packager 135 then uses the project directory structure 120 and the associations provided by the user to generate the map 140.

The map 140 may include both location associations and name associations between the project directory structure 120 and the package directory structure 150. Location associations map locations of files or folders within the project directory structure 120 to locations for those files or folders within the package directory structure 150. Name associations map naming conventions used in the project 115 to naming conventions used in the package 145.

Figure 2A:
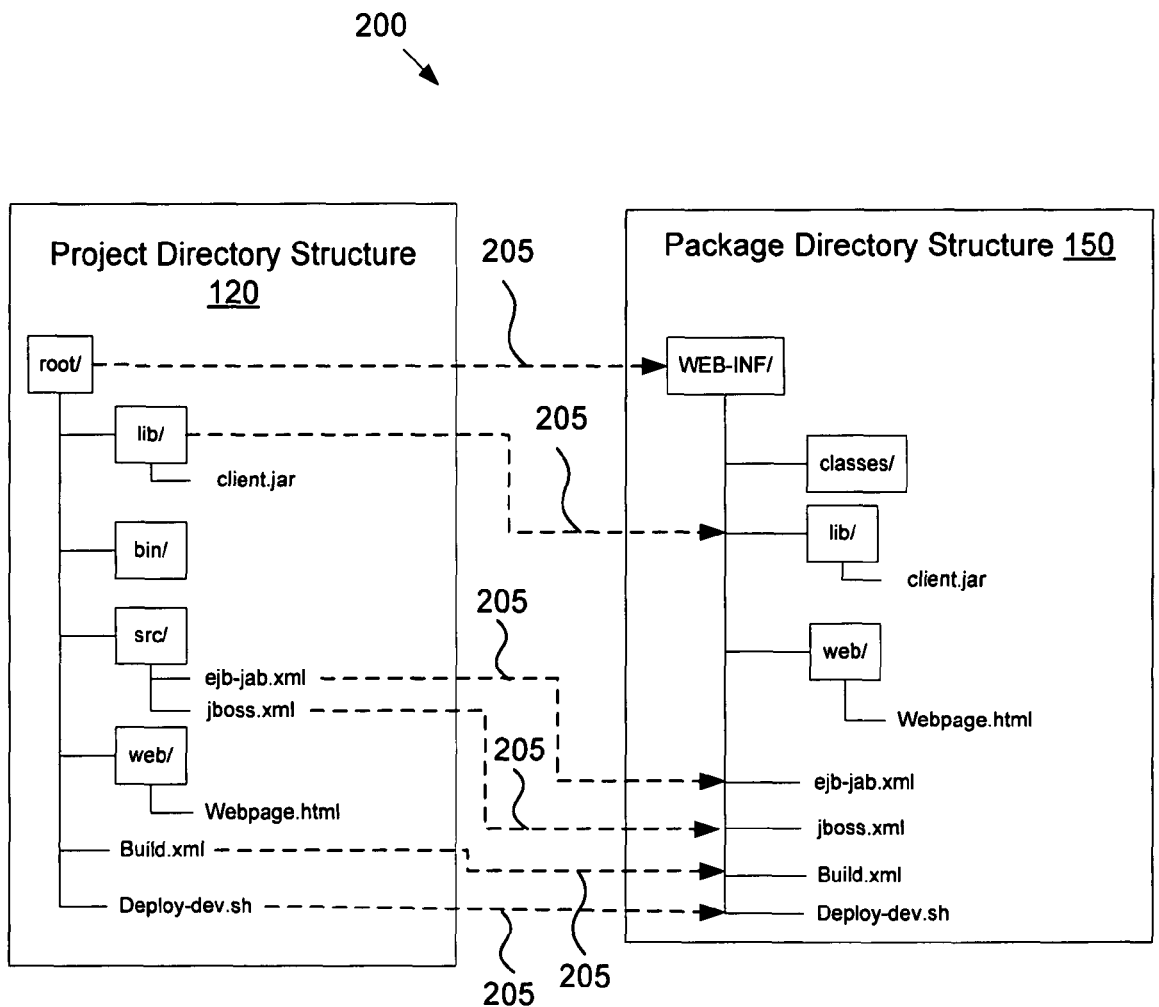
FIG. 2A illustrates a graphical map that associates an exemplary project directory structure with an exemplary package directory structure, in accordance with one embodiment of the present invention.
Figure 2B:
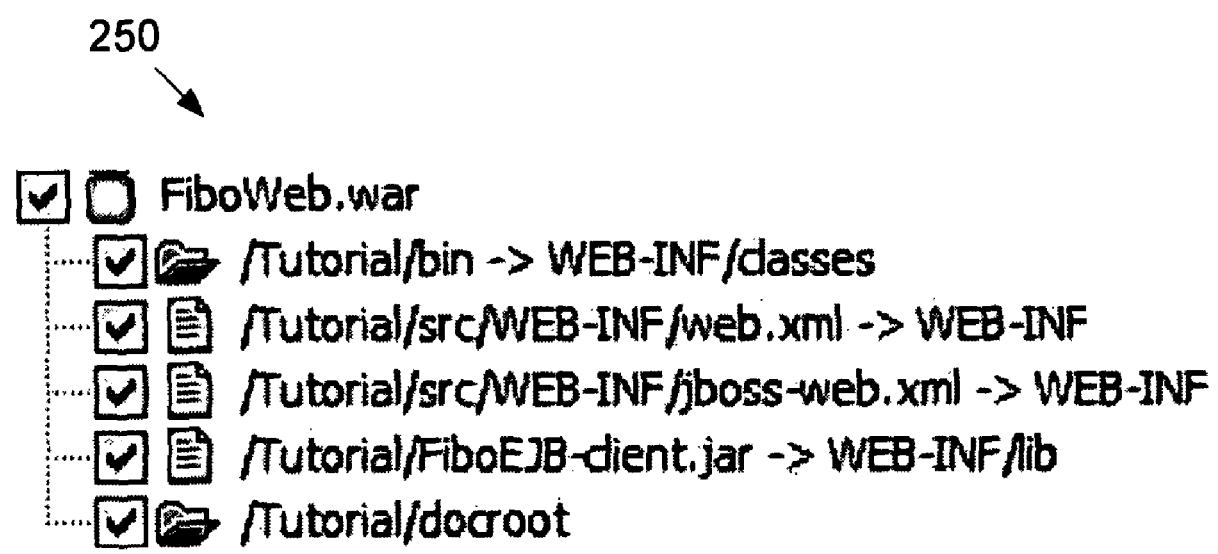
FIG. 2B illustrates a map that associates an exemplary project directory structure with an exemplary package directory structure, in accordance with another embodiment of the present invention.

In one embodiment, the map 140 is generated using a graphical user interface (GUI). The GUI may illustrate a hierarchical or other view of the project directory structure 120 and the package directory structure 150. The user may graphically associate components of the project directory structure 120 with components of the package directory structure 150. An example of such a map 140 is shown in FIG. 2A. Another example of a map 140 is shown in FIG. 2B. Alternatively, the map 140 may be generated using, for example, a command line interface.

Returning to FIG. 1, the packager 135 generates a package 145 from the project 115 once the map 140 is generated and/or upon receiving a user command. Thereafter, packager 135 may repackage the package 145 whenever any resources within the project 115 are detected to change. Repackaging the package 145 may include adding, deleting or modifying files 155 and/or modifying the package directory structure 150 to conform to changes made within the project 115. Only files 155 and/or folders within the package directory structure 150 that correspond to added, removed and/or modified files/folders within the project directory structure 120 may be changed. Therefore, it is not necessary to generate the entire package 145 without prior preparation each time a resource is detected to change within the project 115. Moreover, a package 145 can be rebuilt automatically, and redeployed to the application server 110, as a project 115 is modified. This reduces a time required to generate the package 145, and enables a user to view changes in an application or service in line, as changes are made to the project 115.

In one embodiment, packager 135 determines what changes have occurred within the project directory structure 120 by receiving reports of changed resources from the resource change listener 130. Alternatively, packager 135 may query resource change listener 130 for detected changes. In a further embodiment, functionality of the resource change listener 130 may be included in packager 135. Packager 135 may be configured to rebuild the package 145 each time a change is detected. Alternatively, packager 135 may be configured to rebuild the package 145 periodically (e.g., every hour, every 10 minutes, etc.), when a specified number of changes is detected (e.g., when 5 or 10 resources are detected to change), upon receiving a user command to repackage, and/or intermittently based on other criteria.

In one embodiment, IDE 105 includes a separate resource change listener 130 and/or packager 135 for each project 115. Alternatively, a single resource change listener 130 and/or packager 135 may be used to monitor, and build packages for, multiple different projects 115.

Once package 145 has been packaged or repackaged, it is deployed to the application server 110. Application server 110 is a software engine that provides and/or delivers applications and services to clients. Application server 110 may be configured to handle most or all of the business logic and data access of applications or services. Applications and services may be deployed to the application server 110 by packaging them into packages 145 that are in a format understandable to the application server 110. Application server 110 may require that the package 145 have a specified package directory structure 150 that includes specified files 155. For example, application server 110 may expect a web application to include a root folder called WEB-INF, and may expect classes to reside in a classes folder within the WEB-INF root folder. If no classes folder is present, or no classes are found within a classes folder, the application server 110 may not be able to process package 145.

In the illustrated embodiment, the package 145 has been deployed to the application server 110. The package 145 (and package directory structure 150) is stored on a second storage device 165. The second storage device 165 may be a hard disk drive, an optical drive, a tape backup drive, or a combination thereof. In one embodiment, second storage device 165 is internal to a machine on which the application server 110 is located. Alternatively, the second storage device 165 may be external to the machine on which the application server 110 is located. In one embodiment, the second storage device 165 and the first storage device 160 are combined into a single storage device.

FIG. 2A illustrates a graphical map 200 that associates an exemplary project directory structure 120 with an exemplary package directory structure 150, in accordance with one embodiment of the present invention. The exemplary project directory structure 120 includes a root folder containing a library (lib) folder, a bin folder, a source (src) folder and a web folder. The root folder and additional folders contain various files (e.g., build.xml, deploy-dev.sh, client.jar, webpage.html, etc.). The exemplary package directory structure 150 includes a WEB-INF folder that contains a classes folder, a lib folder and a web folder. The folders of the project directory structure 120 are mapped to specific folders within the package directory structure 145. Files within the project directory structure 120 may be mapped to locations within the package directory structure 150, and may have the same or different names in the package directory structure 150 as in the project directory structure 120. Each association 205 between a file or folder of the project directory structure 120 and the file or folder in the package directory structure 150 is shown graphically. A user may use a graphical user interface to select a different source and/or destination location for each association 205 (e.g., by dragging the association 205 to a new folder or file in the package directory structure or project directory structure). Associations 205 may also be added and/or removed.

FIG. 2B illustrates a map 250 that associates an exemplary project directory structure with an exemplary package directory structure, in accordance with another embodiment of the present invention. The map 250 shows associations between a package directory structure and a project directory structure for a package titled FiboWeb.war. The map associates a tutorial/bin folder from the project directory structure with a WEB-INF/classes folder within the package directory structure. The map further associates files located at Tutorial/src/WEB-INF within the project directory structure with the WEB-INF folder, and the file FiboEJB-client.jar file with the WEB-INF/lib folder of the package directory structure. The tutorial/docroot folder of the project directory structure is not associated with the package directory structure.

Figure 3:
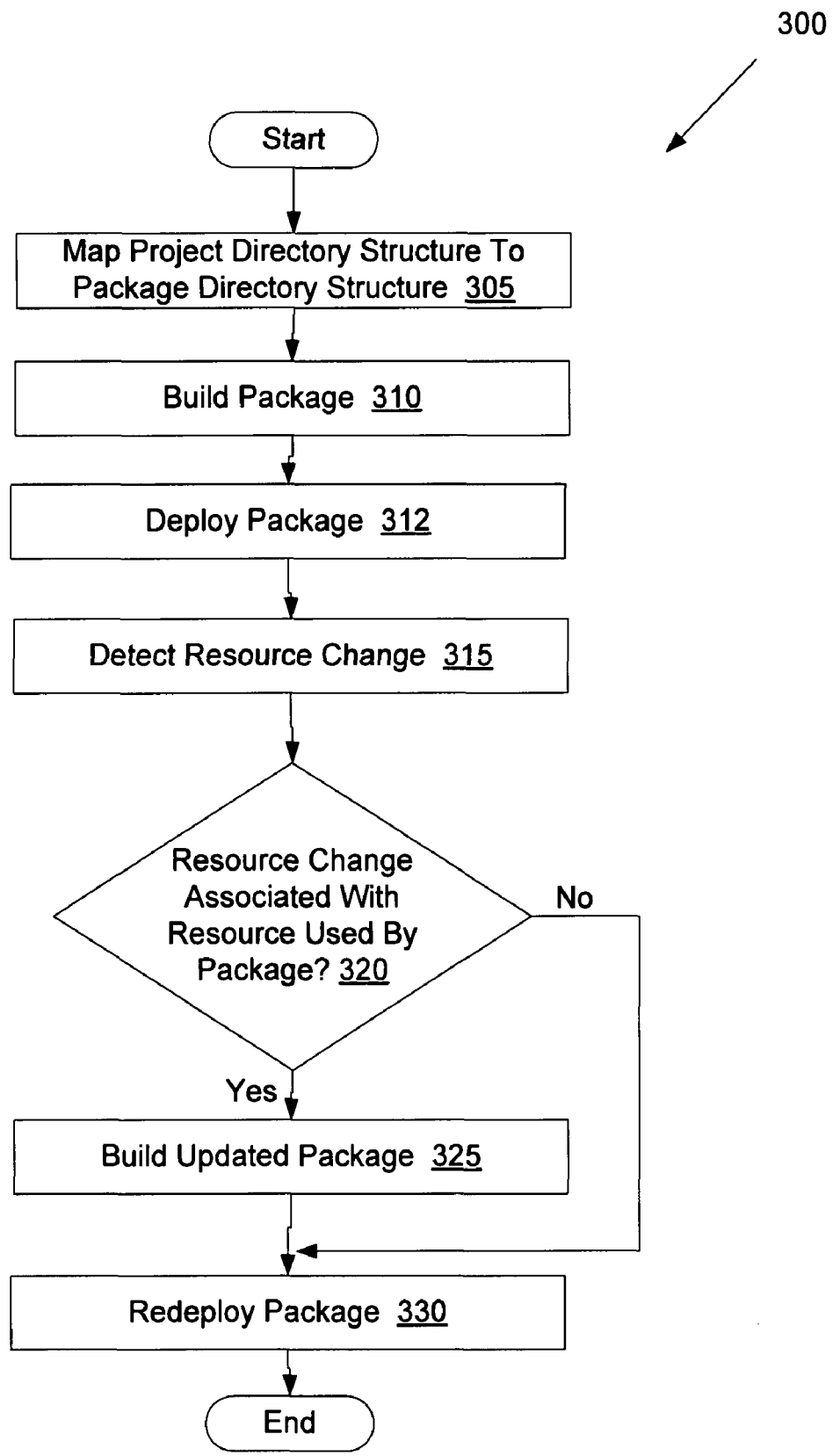
FIG. 3 illustrates a flow diagram of one embodiment for a method of incrementally packaging a service or application.

FIG. 3 illustrates a flow diagram of one embodiment for a method 300 of incrementally packaging a service or application. The method may be performed by processing logic that may comprise hardware (e.g., circuitry, dedicated logic, programmable logic, microcode, etc.), software (such as instructions run on a processing device), or a combination thereof. In one embodiment, method 300 is performed by the IDE 105 of FIG. 1. In a further embodiment, at least portions of method 300 are performed by packager 135 of FIG. 1.

Referring to FIG. 3, method 300 includes processing logic mapping a project directory structure to a package directory structure (block 305). The mapping may be based on user-provided associations between components of the project directory structure and components of the package directory structure. Alternatively, the mapping may be based on a mapping template. The mapping template may include common associations between the project directory structure and the package directory structure (e.g., for a distinct type of service or application).

At block 310, a package is built. Building the package includes copying resources from the project directory structure to the package directory structure using the mapped associations. Building the package may further include renaming some or all of the copied resources and/or compressing the package.

At block 312, the package is deployed to an application server. Deploying the package to the application server may include uploading the package to the application server and/or placing the package within a specific location (e.g., folder) that is monitored by the application server.

At block 315, a resource change is detected. The resource change may include deletion of a resource, an addition of a new resource, and/or a modification of an existing resource within the project directory structure. In one embodiment, the resource change is detected by a resource change listener 130, as shown in FIG. 1.

At block 320, processing logic determines whether the resource change is associated with a resource that is used by the package. A resource is used by the package if it has been mapped to a location within the package directory structure. If the resource change is associated with a resource used by the package, the method proceeds to block 325. Otherwise, the method proceeds to block 330.

At block 325, an updated package is built. In one embodiment, building an updated package includes generating a new package. In another embodiment, building an updated package includes modifying an existing package by adding, removing and/or modifying resources within the package to conform with additions, deletions, or modifications made to resources within the project directory structure.

At block 330, the package is redeployed. Redeploying the package may include uploading the updated package to an application server (e.g., application server 110 of FIG. 1). The method then ends.

Figure 4:
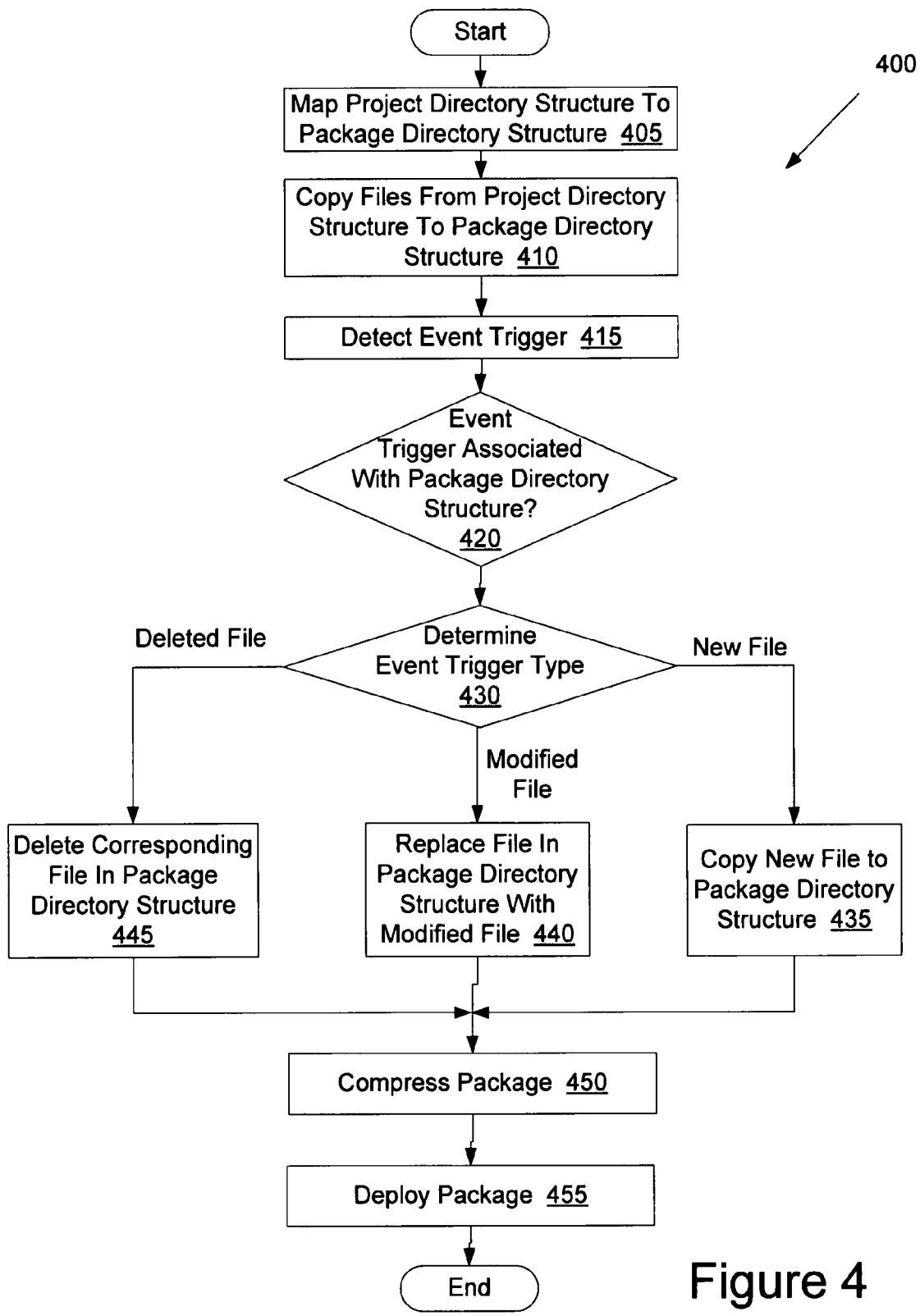
FIG. 4 illustrates a flow diagram of another embodiment for a method of incrementally packaging a service or application.

FIG. 4 illustrates a flow diagram of another embodiment for a method 400 of incrementally packaging a service or application. The method may be performed by processing logic that may comprise hardware (e.g., circuitry, dedicated logic, programmable logic, microcode, etc.), software (such as instructions run on a processing device), or a combination thereof. In one embodiment, method 400 is performed by the IDE 105 of FIG. 1. In a further embodiment, at least portions of method 400 are performed by packager 135 of FIG. 1.

Referring to FIG. 4, method 400 includes processing logic mapping a project directory structure to a package directory structure (block 405). The mapping may be based on user-provided associations between components of the project directory structure and components of the package directory structure. Alternatively, the mapping may be based on a mapping template. The mapping template may include common associations between the project directory structure and the package directory structure.

At block 410, files are copied from the project directory structure to the package directory structure to build a package.

At block 415, an event trigger is detected. The event trigger may be a detection of a changed resource within the project directory structure. At block 430, processing logic determines an event trigger type. The event trigger may be one of a deleted file, a modified file and a new file. If the event trigger is a deleted file, the method continues to block 445. If the event trigger is a modified file, the method proceeds to block 440. If the event trigger is a new file, the method proceeds to block 435.

At block 445, a file within the package directory structure that corresponds to the file that was deleted in the project directory structure is deleted. For example, if a file labeled File1 is deleted in the project directory structure, updating the project may include deleting an associated File1 within the package directory structure.

At block 440, a file in the package directory structure that corresponds to the file that was modified in the project directory structure is replaced with the modified file. For example, if File1 was modified in the project directory structure, then updating the package may include performing the same modifications on File1 in the package directory structure.

At block 435, the new file is copied to the package directory structure according to the map.

At block 450, the package is compressed. The package may be compressed, for example, into a .war file format. Alternate compression algorithms may also be used to compress the package into, for example, a zip or other file format. At block 455, the package is deployed (e.g., to an application server). Deploying the package to the application server may include uploading the package to the application server and/or placing the package within a specific location (e.g., folder) that is monitored by the application server. The method then ends.

Figure 5:
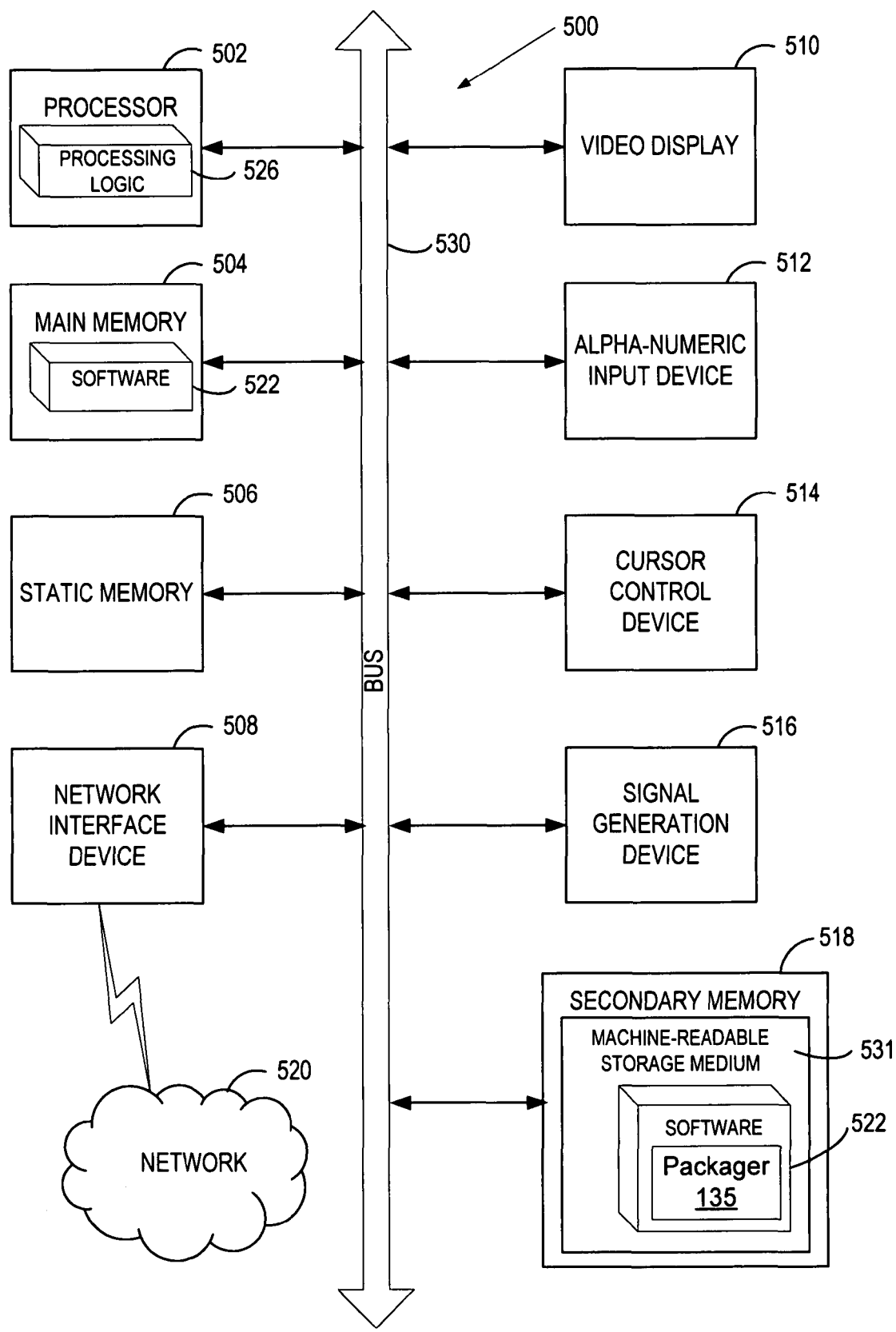
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the packager 135 of FIG. 1, and/or a software library containing methods that call the packager 135. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
   mapping, by a computer system executing a software development environment, a project directory structure of an application or service to a package directory structure, wherein the project directory structure is for the software development environment and the package directory structure is for an application server;
   building, by the computer system, a package for the application or service, wherein the package is an assembled application or service executable by the application server, and wherein building the package includes copying files from the project directory structure to the package directory structure in accordance with the mapping, renaming one or more of the files, combining the files into a single unit that is deployable to the application server, and compressing the single unit;
   detecting an event trigger, wherein the event trigger is one of a new file, a modified file, or a deleted file in the project directory structure; and building an updated package for the application or service using an operation that includes at least one of copying the new file to the package directory structure, replacing an existing file in the package directory structure with the modified file, or deleting a file in the package directory structure that corresponds to the deleted file in the project directory structure, wherein the updated package is a new single unit that is deployable to the application server.

2. The method of claim 1, wherein the updated package is built automatically upon detecting the event trigger.

3. The method of claim 1, wherein the project directory structure is mapped to the package directory structure using a graphical user interface.

4. The method of claim 1, wherein the mapping is provided by a project directory mapping template.

5. The method of claim 1, further comprising:
deploying the application or service after building of the package is completed; and
automatically redeploying the application or service after building of the updated package is completed.

6. A computing apparatus comprising:
a memory to store instructions for a software development environment; and
a processing device, coupled to the memory, to execute the instructions, wherein the instructions cause the processing device to:
create a map associating a project directory structure of a project pertaining to an application or service with a package directory structure of a package pertaining to the application or service, wherein the project directory structure is for the software development environment and the package directory structure is for an application server;
build the package for the application or service, wherein the package is an assembled application or service executable by the application server, and wherein building the package includes copying files from the project directory structure to the package directory structure in accordance with the mapping, renaming one or more of the files, combining the files into a single unit that is deployable to the application server, and compressing the single unit;
detect a resource change in the project directory structure; and
update the package by applying the resource change to the package directory structure.

7. The computing apparatus of claim 6, wherein the project directory structure is managed by an integrated development environment.

8. The computing apparatus of claim 6, wherein the processing device is further to automatically update the package upon detecting the event trigger.

9. The computing apparatus of claim 6, wherein the processing device is further to display at least one of the project directory structure, the package directory structure, and the map.

10. The computing apparatus of claim 6, wherein the map includes a project directory mapping template.

11. The computing apparatus of claim 6, further comprising:
a server on which to deploy the application or service upon completion of the package; and
the processing device to automatically redeploy the application or service on the server upon completion of an updated package.

12. The computing apparatus of claim 6, wherein:
the changed resource includes one of a new file, a modified file, or a deleted file; and
applying the resource change includes performing an appropriate one of copying the new file to the package directory structure, replacing an existing file in the package directory structure with the modified file, or deleting a file in the package directory structure that corresponds to the deleted file in the project directory structure.

13. The computing apparatus of claim 6, further comprising:
a storage device to store at least one of the project directory structure or the package directory structure.

14. A computer-readable storage medium including instructions that, when executed by a computer system, cause the computer system to perform a method comprising:
mapping, by the computer system, while executing a software development environment, a project directory structure of an application or service to a package directory structure, wherein the project directory structure is for the software development environment and the package directory structure is for an application server;
building, by the computer system, a package for the application or service, wherein the package is an assembled application or service executable by the application server, and wherein building the package includes copying files from the project directory structure to the package directory structure in accordance with the mapping, renaming one or more of the files, combining the files into a single unit that is deployable to the application server, and compressing the single unit;
detecting an event trigger, wherein the event trigger is one of a new file, a modified file, or a deleted file in the project directory structure; and
building an updated package for the application or service using an operation that includes at least one of copying the new file to the package directory structure, replacing an existing file in the package directory structure with the modified file, or deleting a file in the package directory structure that corresponds to the deleted file in the project directory structure, wherein the updated package is a new single unit that is deployable to the application server.

15. The computer-readable medium of claim 14, wherein the updated package is built automatically upon detecting the event trigger.

16. The computer-readable medium of claim 14, wherein the project directory structure is mapped to the package directory structure using a graphical user interface.

17. The computer-readable medium of claim 14, wherein the mapping is provided by a project directory mapping template.

18. The computer-readable medium of claim 14, the method further comprising:
deploying the application or service upon completion of the package; and
automatically redeploying the application or service upon completion of the updated package.

* * * * *